United States Patent [19]

Flux

[11] Patent Number: 4,988,248
[45] Date of Patent: Jan. 29, 1991

[54] RELEASABLE COUPLING OR ATTACHMENT DEVICE

[75] Inventor: Peter R. Flux, Wilshire, England

[73] Assignee: Latchways Limited, Wiltshire, England

[21] Appl. No.: 462,101

[22] Filed: Jan. 8, 1990

[30] Foreign Application Priority Data

Jan. 16, 1989 [GB] United Kingdom ............ 8900904

[51] Int. Cl.$^5$ .................... F16B 21/00; F16D 1/00
[52] U.S. Cl. ........................... 411/348; 411/351; 403/328; 280/507
[58] Field of Search .......... 411/348, 351, 354; 403/328, DIG. 6; 24/453; 280/504, 507, 508

[56] References Cited

U.S. PATENT DOCUMENTS

| | | | |
|---|---|---|---|
| 2,968,205 | 1/1961 | Springate | 411/348 |
| 3,180,390 | 4/1965 | Ockert, Jr. | 411/348 |
| 3,596,554 | 8/1971 | Low | 411/348 |
| 4,016,914 | 4/1977 | Zurko | 411/348 |

FOREIGN PATENT DOCUMENTS

| | | |
|---|---|---|
| 89307199.3 | 1/1990 | European Pat. Off. . |
| 644171 | 10/1950 | United Kingdom ............... 403/328 |
| 2140495 | 12/1986 | United Kingdom . |

*Primary Examiner*—Neill R. Wilson
*Attorney, Agent, or Firm*—Frishauf, Holtz, Goodman & Woodward

[57] ABSTRACT

A plug-in connector device comprises a ring-like head portion and a hollow shank. The shank has locking balls which can be held to project outwardly of the shank in a locked condition of the device, and can also move to a retracted position under the control of an axially slidable probe, the movement of which is controlled by an actuator lever on the head portion which can only be moved to release the locking balls from their locked condition on a separate manipulation of a second lever, or in other embodiments a safety catch button, also mounted on the head portion.

12 Claims, 10 Drawing Sheets

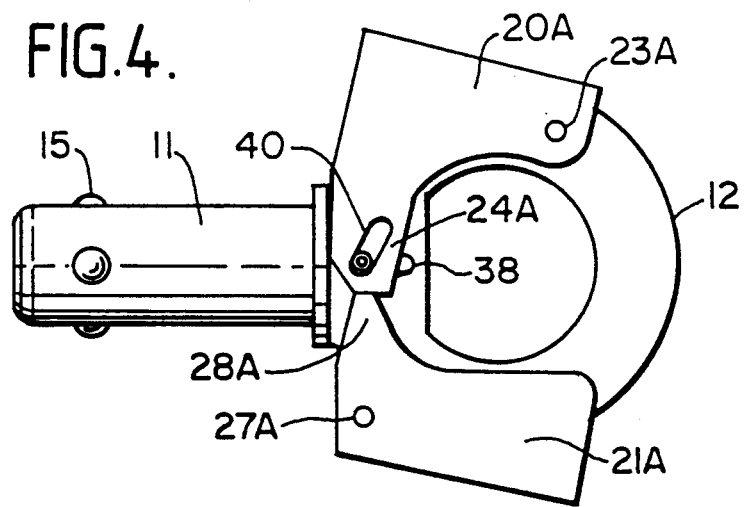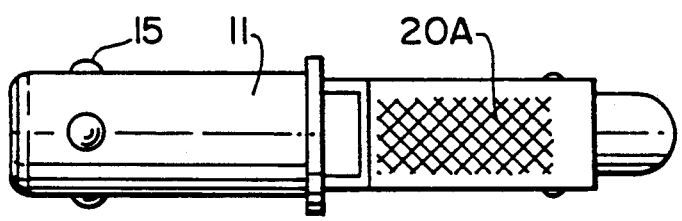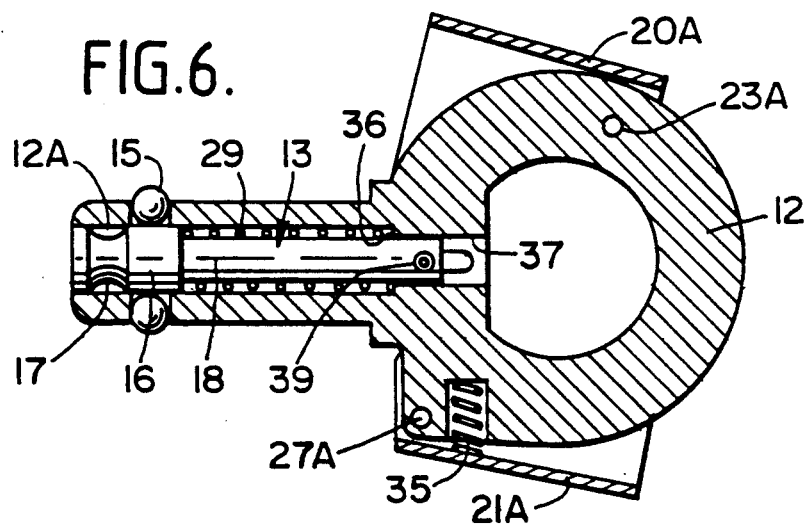

RELEASABLE COUPLING OR ATTACHMENT DEVICE

This invention relates to releasable coupling or attachment devices, and particularly, but not exclusively, to such devices adapted to plug-in to fixedly located receptor sockets to be releasably locked therein. European Patent Application No. 89307199.2 the disclosure of which is incorporated herein by reference, describes and illustrates in FIG. 32, a coupling or attachment device adapted to make a releasable plug-in connection in a receptor socket fixedly located within a wall structure. Release of the device is achieved by axial movement of a bulb-shaped actuator. However such device may not be suitable for certain applications where a safety or security line is attached to the coupling device or other applications where an accidental release of the connection could be harmful, e.g. scaffolding systems, because the device could be released by any inadvertent or accidental engagement with the actuator. Although provision is made in such device for a locking pin to be engaged in the device to provide a mechanical lock for the device in its locking condition, the use of the locking pin relies on use thereof by the operator and may not therefore provide sufficient security.

The invention therefore seeks to provide releasable coupling or attachment devices which are less prone to accidental disengagement even without the engagement of a mechanical lock in the engaged condition of the device.

The invention provides a coupling or attachment device comprising a head portion and a hollow shank projecting therefrom for plugging into a receptor socket, the shank being provided with locking means movable transversely thereof between a projecting locked condition and a retracted free condition, and control means movably mounted within the shank between a first position maintaining the locking means in said locked condition and a second position allowing movement of said locking means to said free condition, said head portion having actuator means for moving said control means from said first position to said second position and further means cooperating with the actuator means and adapted to prevent operation of said actuator means by an inadvertent or accidental engagement therewith.

Said locking means may comprise at least one locking member movable transversely of the axis of the shank through an aperture in the wall thereof. Said control means may comprise a control member slidably mounted within the shank and having portions to act on said locking member to maintain it in said locked condition and to allow it to move to said free condition, respectively.

Preferably said control means are biassed by resilient means to said first position thereof.

In some embodiments, said actuator means may comprise a pivotally mounted release lever having a portion interlinked with said control means, said lever having a portion projecting from said head portion allowing a manual manipulation of the release lever to move said control means from said first position to said second position thereof. Said further means may comprise a pivotally mounted second lever having an abutment portion engaging a portion of said release lever to prevent movement thereof to move said control means from said first position to said second position thereof, said second lever having a portion projecting from said head portion allowing a manual manipulation of the second lever to remove said abutment portion from its position obstructing operation of said release lever. In other arrangements, said further means may comprise manually operable means located on said head portion and having an abutment portion cooperating with said control means to prevent movement of said control means from said first position to said second position thereof, said manually operable means being movable, when manually operated, to remove said abutment portion from cooperation with said control means thereby allowing movement of said control means to said second position upon actuation of said release lever.

In other embodiments, said actuator means and said further means comprise manually depressable catch members located on opposite sides of said head portion and linked to said control means so that sliding movement of the catch members cause said control means to move from said first position to said second position thereof, and abutment means on respective opposite sides of said head portion to prevent said sliding movement of the catch member until both catch members have been manually depressed.

In further embodiments, said actuator means may comprise a pivotally mounted release lever having a portion interlinked with said control means, said further means comprising a head portion adapted to contain said release lever internally thereof thereby to shield the release lever from accidental actuation, means being provided to enable the release lever to be operated preferably only by a suitably shaped tool. Said latter means may comprise a pair of aligned apertures in flank portions of said head portion overlying opposite sides of the actuation lever and an aperture in said actuation lever which is partly out of alignment with said pair of aligned apertures when said control means is in said first position thereof, requiring insertion of a suitably shaped tool into said aperture and said pair of apertures to bring them all into alignment thereby pivoting the release lever to move the control means to said second position thereof.

Embodiments of the invention will now be described by way of example and with reference to the accompanying drawings, in which:

FIG. 4 is a side view of another embodiment of a releasable coupling device according to the invention;

FIG. 5 is a plan view of the device Of FIG. 4;

FIG. 6 is a cross-section through the device of FIGS. 4 and 5;

Figure 1:
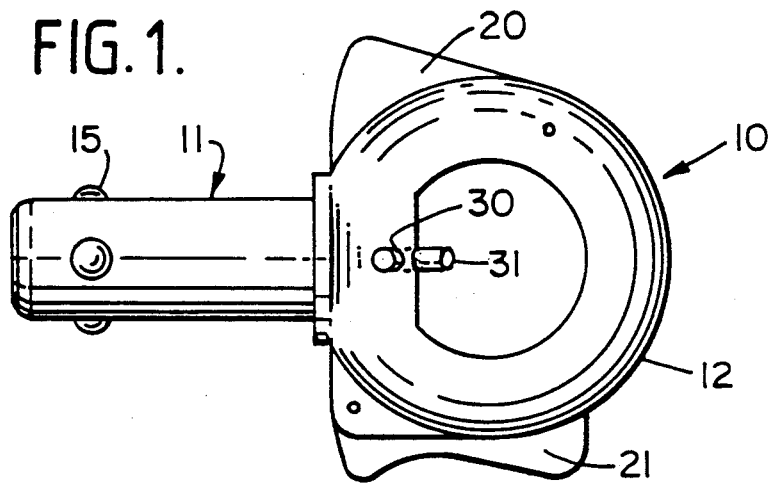
FIG. 1 is a side view of a releasable coupling device embodying the invention comprising a body part which can be plugged into a socket part.
Figure 2:
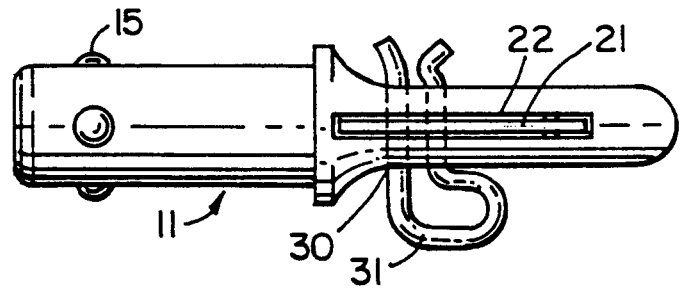
FIG. 2 is a plan view of the device of FIG. 1.
Figure 3:
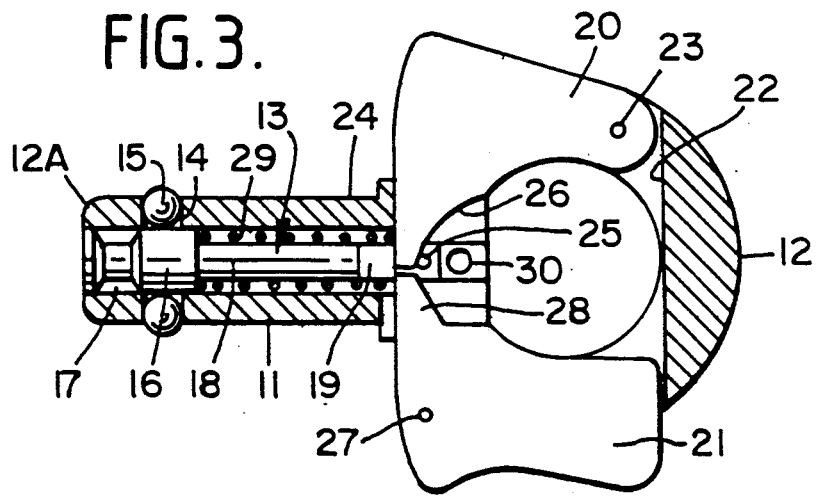
FIG. 3 is a vertical cross-section through the device of FIG. 1.
Figure 8:
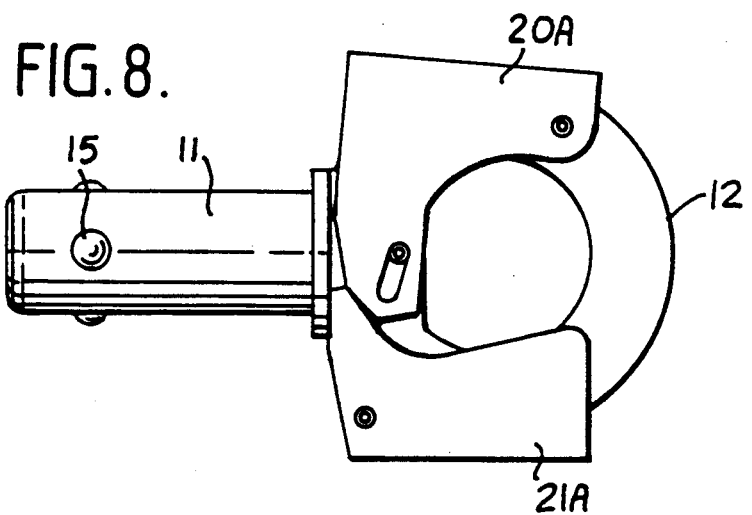
Figure 9:
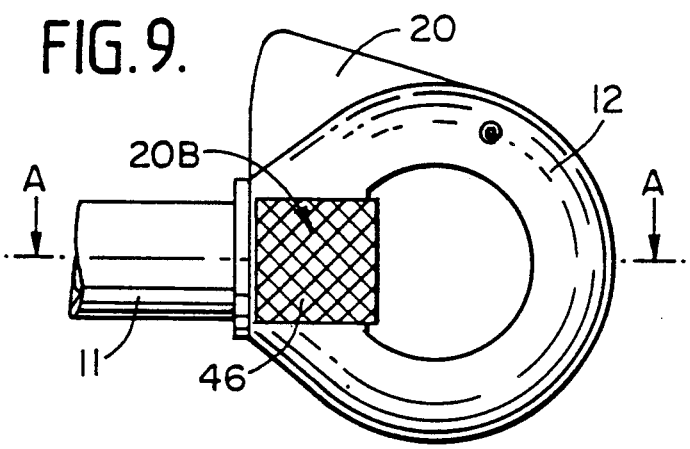
Figure 10:
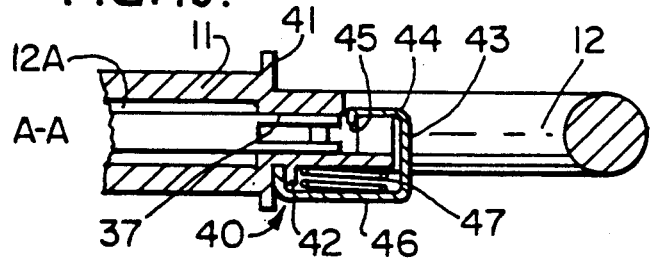
Figure 11:
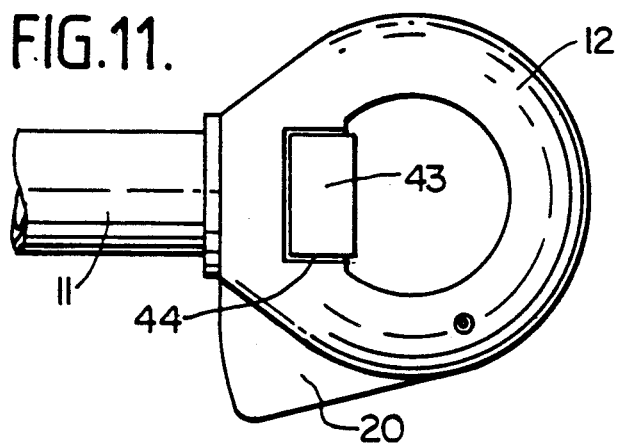
Figure 12:
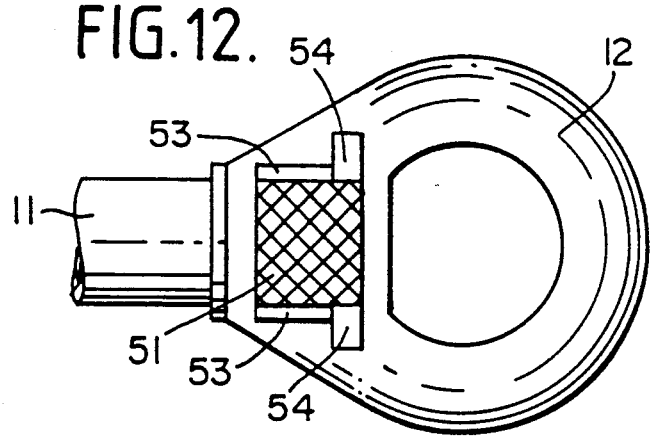
Figure 13:
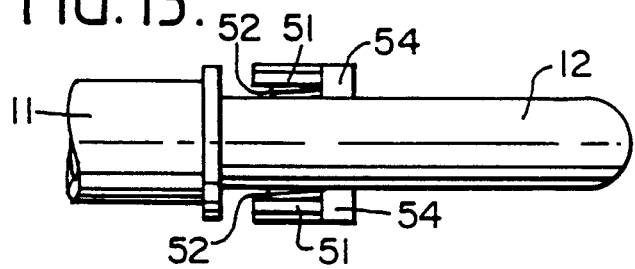
Figure 14:
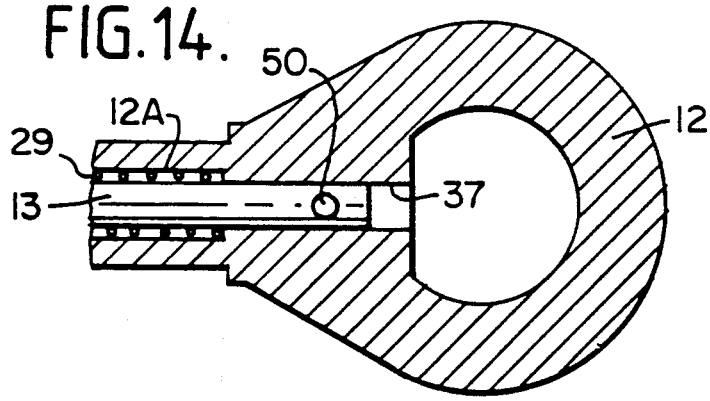
Figure 15:
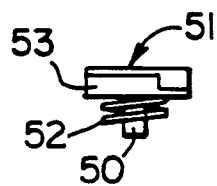
Figure 16:
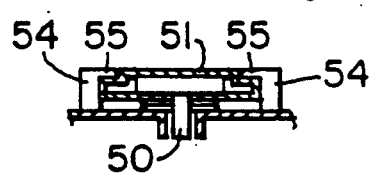
Figure 17:
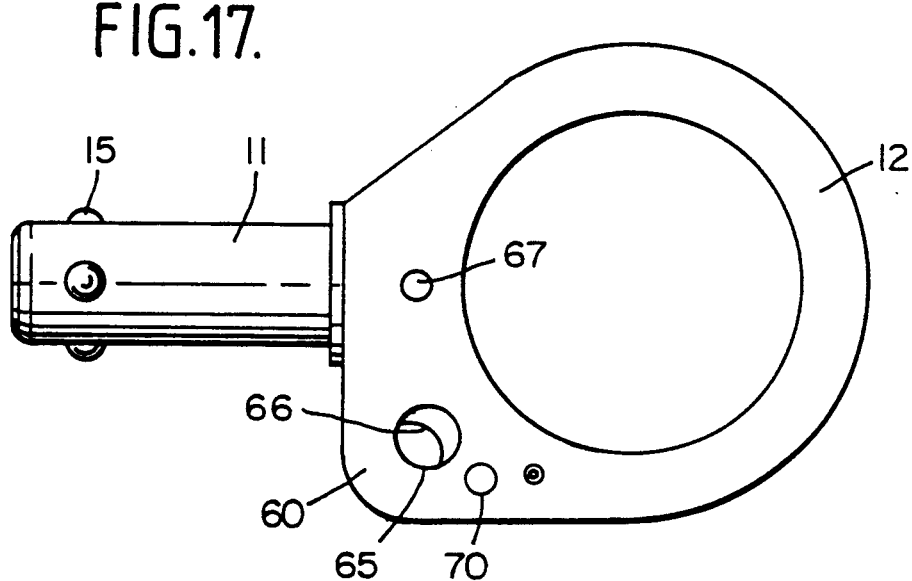
Figure 18:
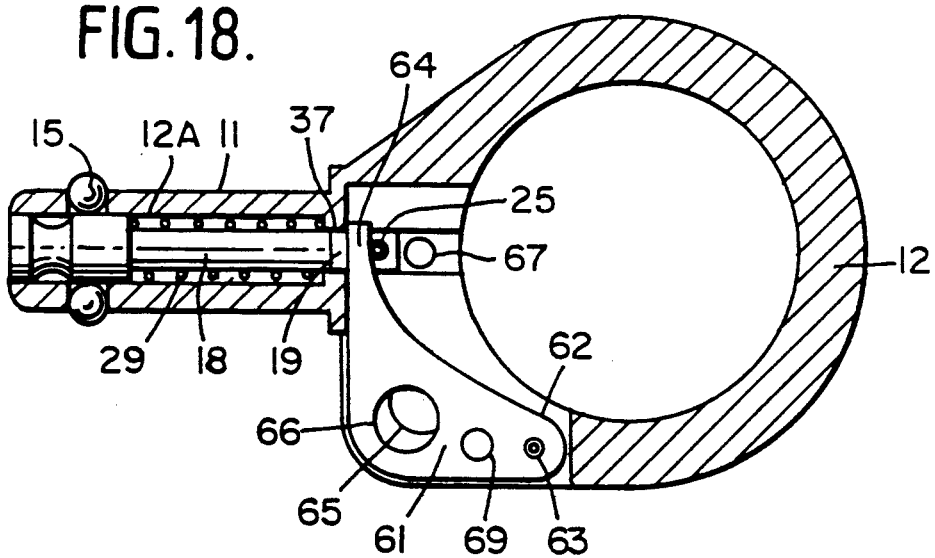
Figure 19:
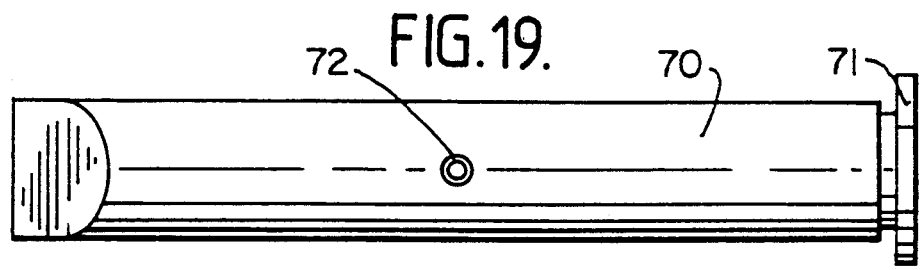
Figure 20:
Figure 21:
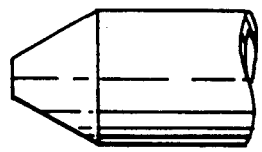
Figure 22:
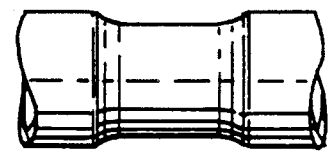
Figure 23:
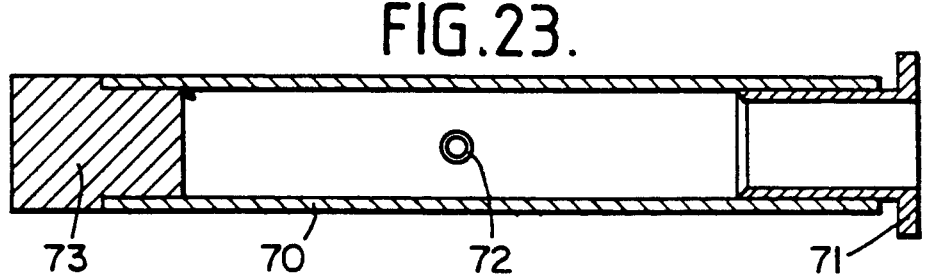
Figure 24:
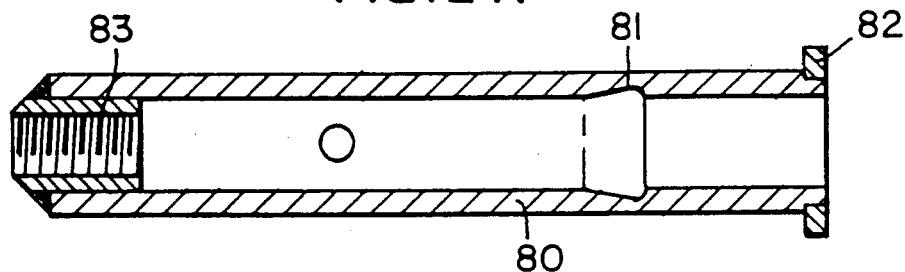
Figure 25:
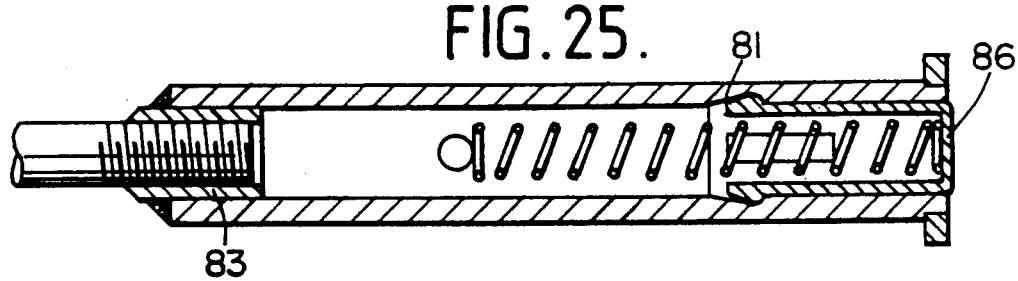
Figure 26:
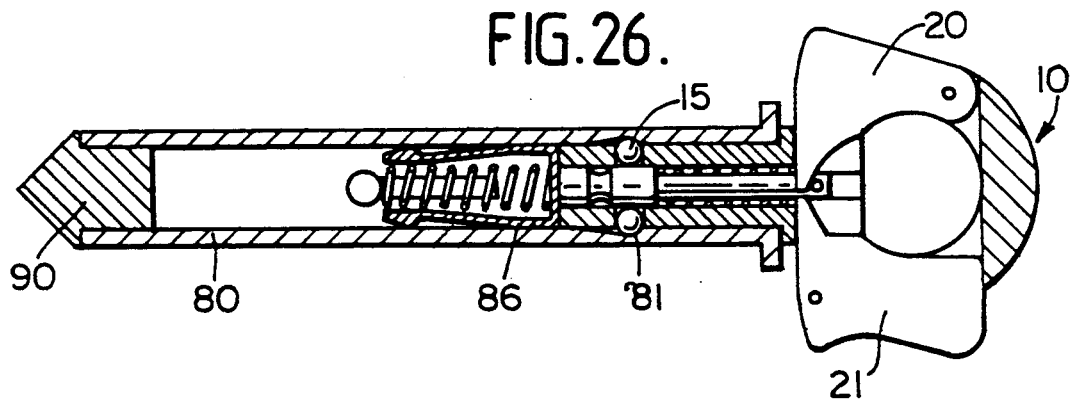
Figure 27:
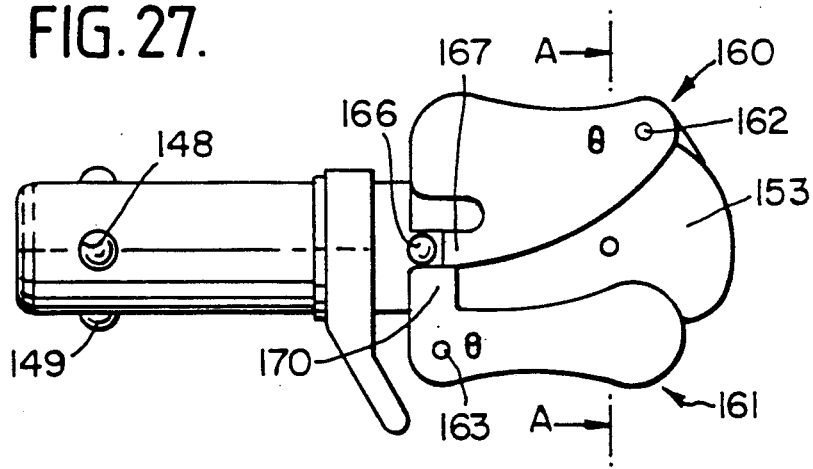
Figure 28:
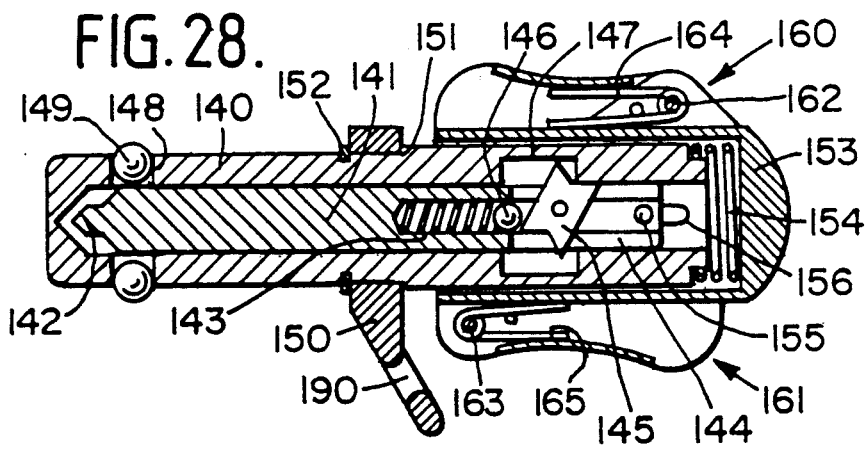
Figure 29:
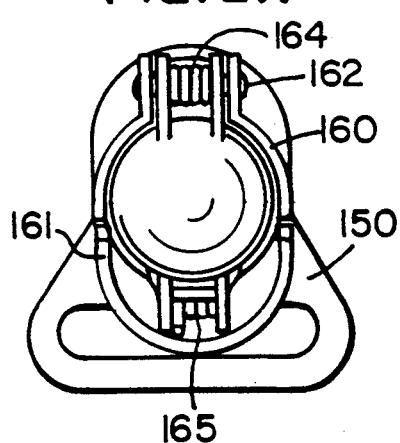
Figure 30:
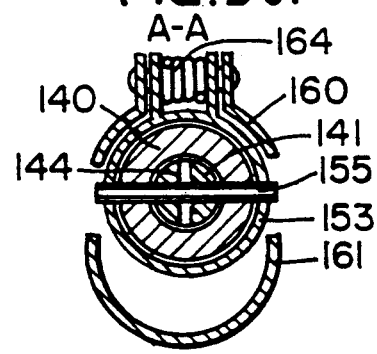
Figure 31:
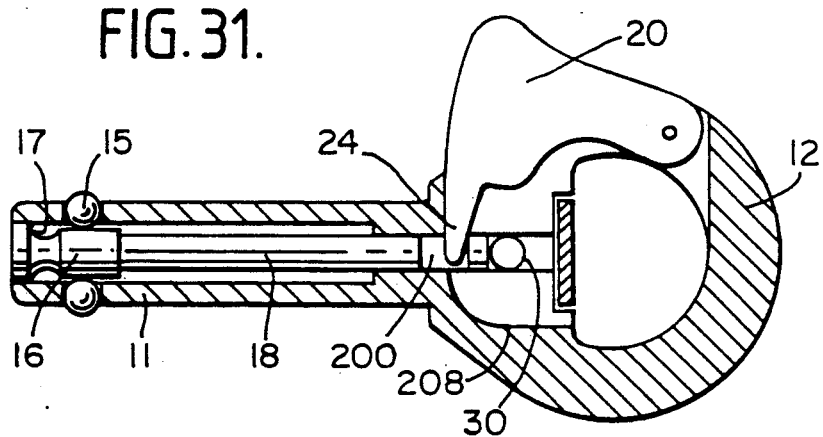
Figure 32:
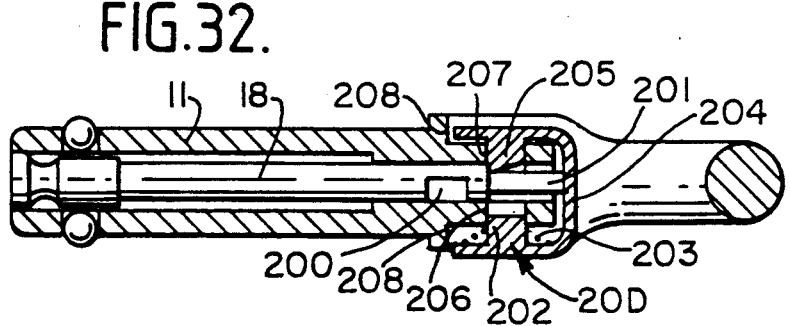
Figure 33:
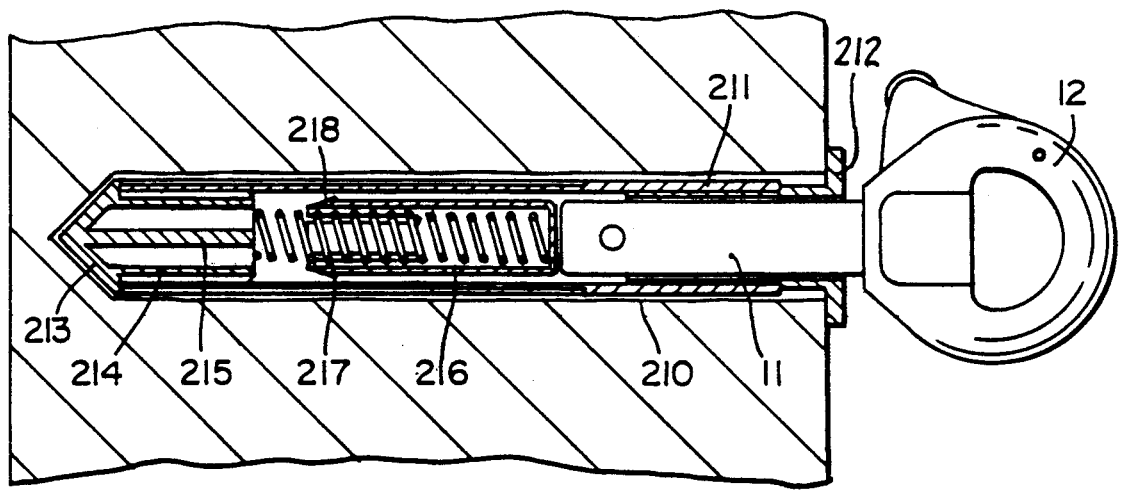

FOG. 7 is a side view of the device of FIGS. 4 to 6 showing the first stage of a release sequence;

FIG. 8 is a side view of the device of FIGS. 4 to 6 showing a second stage of a release sequence;

FIG. 9 is a side view of a further embodiment of a coupling device according to the invention;

FIG. 10 is a cross-sectional detail of the device of FIG. 9;

FIG. 11 is an opposite side view of the device of FIG. 9;

FIG. 12 is a side view of a portion of a further coupling device embodying the invention;

FIG. 13 is a plan view of the portion of the device shown in FIG. 12;

FIG. 14 is a cross-section through the portion of the device shown in FIG. 12;

FIG. 15 is a side view of a portion of a release catch of the device of FIG. 12;

FIG. 16 is an end view of the catch of FIG. 15 and a cooperating portion of the head portion of the coupling device, the catch being shown in the release position;

FIG. 17 is a side view of a further embodiment of a coupling device in accordance with the invention;

FIG. 18 is a cross-section through the device of FIG. 17;

FIG. 19 is a side view of a socket for receiving a coupling device in accordance with the invention;

FIG. 20 is an end view of the socket of FIG. 19;

FIG. 21 shows an alternative end section of the socket of FIG. 19;

FIG. 22 shows a side view of an alternative intermediate section of the socket of FIG. 19;

FIG. 23 is a section through an alternative form of socket;

FIG. 24 is a cross-section through another form of socket;

FIG. 25 is a cross-section through a further form of receiving socket;

FIG. 26 is a cross-section through an assembly comprising a further receiving socket with the coupling device of FIGS. 1 to 3 engaged therein;

FIG. 27 is a side view of a further embodiment of the invention;

FIG. 28 is a vertical cross-section through the device of FIG. 27;

FIG. 29 is an end view of the device of FIG. 27;

FIG. 30 is a cross-section along the line A—A in FIG. 27;

FIG. 31 is a vertical cross-section through another embodiment;

FIG. 32 is a horizontal cross-section through the device of FIG. 31; and,

FIG. 33 is a side view partly in cross-section of the device of FIGS. 31 and 32 when plugged into a receptor socket recessed into a wall.

Referring to FIGS. 1 to 3, there is shown a lockable coupling device in accordance with the invention which is adapted for engagement in a receptor socket part which is recessed into a wall structure, into which the coupling device may be releasably secured in use. The coupling device (10) has the general form of an eyebolt having a hollow shank portion (11) and a ring-shaped head portion (12). The shank portion (11) has an axial bore (12A) in which a plunger (13) is slidably mounted. The shank portion (11) is also formed near its free end with a plurality, in the present embodiment four, of equi-angularly spaced apertures (14) which extend radially through the annular wall of the shank portion (11) and receive a corresponding number of locking balls (15). The walls of the apertures (14) converge slightly in the radially outward direction so as to hold captive the balls whilst allowing them to project radially outwardly of the cylindrical periphery of the shank portion (11) in the locking position.

The plunger has an end section (16) which has a diameter providing a sliding fit within a bore (12A). An annular recess (17) is formed in this end section (16) to receive the locking balls (15) in a release condition of the coupling device enabling it to be withdrawn from a receptor socket. The plunger has a reduced diameter portion (18) which projects towards the ring-shaped head portion of the device and is formed with an axial slot (19) in its free end portion.

The coupling device is provided with a release mechanism mounted in its head portion (12). The release mechanism comprises a release catch (20) and a cooperating safety catch (21) both of which must be manipulated in order to permit the release mechanism to be operated so as to cause unlocking of the coupling device enabling it to be withdrawn from a receptor socket in which it is lockably secured in use. In this way, an accidental release of the device by an engagement with the release catch (20) is prevented and release of the device can only be achieved by manipulation of both the release catch (20) and the safety catch (21).

A transverse slot (22) is formed through the ring-shaped head portion (12) of the device. The release catch (20) is in the form of a lever pivotally mounted on a pin (23) extending transversely through the slot (22) and having an inwardly projecting leg (24) which extends into the slot (19) provided in the end section of the plunger portion (18). A further transverse pin (25) is provided across the slot (19) in the plunger and the leg portion (24) of the release catch (20) engages beneath the pin (25) so that when the catch (20) is pressed inwardly to pivot about the pin (23), a curved cam surface (26) formed on the side of the leg portion (24) engaging the pin (25) acts on the pin (25) so as to cause the plunger (13) to move in the rightward direction as seen in FIG. 3 until the annular recess (17) in the plunger is located opposite the locking balls (15). The device can then be withdrawn from the receptor socket with the locking balls (15) being free to move inwardly of the outer periphery of the shank (11) by engagement in the annular recess (17) in the plunger (18).

In order to prevent accidental release of the connector device (12), actuation of the safety catch (21) is also necessary before the release catch (20) can be operated to cause the above-described release sequence. The safety catch (21) is pivotally mounted about a further pin (27) which extends transversely of the slot (22) in the head portion (12) of the connector device. The catch (21) has a main body part projecting outwardly of the head portion (12) so that it can be easily manually manipulated. The catch (21) has an inwardly projecting leg (28) which extends towards the leg portion (24) of the release catch (20) so that the end surfaces of the leg portions (24 and 28) thereof are normally in abutment whereby inward movement of the release catch is prevented until the safety catch has been released. When the main body portion of the safety catch (21) is pressed inwardly of the head portion (12) of the device, it pivots about pin (27) thereby moving its leg portion (28) out of alignment with the leg portion (24) of the release catch. The release catch can then be manually manipulated to cause unlocking of the device. A compression spring (29) is provided about the reduced diameter portion (18) of the plunger and acts between an end surface of the larger diameter portion (16) of the plunger and at its other end acts against the leg portions (24 and 28) of both the release and safety catches (20,21). In this way, both the plunger and the release and safety catches are biassed to a locked condition of the device. In order to release the device, a two finger squeezing operation of the safety catch (21) and the release catch (20) is required.

The locking balls (15) may in other embodiments be replaced by different forms of locking members, for example locking collets, locking pegs or suitably shaped locking segments. Furthermore aligned transverse apertures (30) may be formed in an end section of the bore (12) which intersects the slot (22) formed in the head portion of the device, for receiving one leg of an R-clip (31) which can be engaged therein with the connector device in its locked condition in an aperture in order to provide stop means for preventing movement of the plunger (18) to an unlocked condition. The clip (31) when engaged therefore provides a mechanical lock of the device to provide extra security against accidental release in an operating condition.

The coupling device shown in FIGS. 4 to 6 has the same general form as the device of FIGS. 1 to 3 but is formed with a different locking mechanism. Similar parts of this embodiment are given the same reference numerals as those of the first embodiment and the following description of this embodiment will be restricted to the modified form of locking mechanism. In this embodiment, the release and safety catches (20A and 21A) are generally U-shaped members which embrace sections of the ring-shaped head portion (12) of the device rather than the plate members (20,21) of the first embodiment which engage in a transverse slot through the head portion (12). The release and safety catches (20A and 21A) are similarly pivotted about pins (23A,27A) which engage through and project from the head portion (12). The release and safety catches (20A and 21A) again have inwardly projecting leg portions (24A and 27A) which normally abut one another in order to prevent an accidental release of the device unless both catches are operated in sequence. In this embodiment, the safety catch (21A) is provided with a separate bias in the form of a compression spring (35) located in a blind bore in the head portion (12) to act against the underside of the base portion of the U-shaped safety catch body (21A) to bias that catch to its engaged position preventing operation of the release catch (20A) as illustrated in FIG. 4. The compression spring (29) biassing the plunger (13) acts at one end on an inwardly stepped shoulder (36) of the bore (12A). The bore (12A) therefore has a narrow diameter end portion (37) within the head portion (12) of the device and aligned transverse slots (38) are formed along the length thereof. A pin (39) is provided through the end portion of the narrow diameter section (18) of the plunger which engages in the bore portion (37) to project through the slots (38) and outwardly thereof to engage in further slots (40) formed in the inwardly projecting side walls (24A) of the release catch (20A).

In order to effect an unlocking sequence, the safety catch (21A) must be pressed inwardly in order to move its leg portion (28A) from locking abutment with the leg portion (24A) of the release catch (20A). The release catch (20A) can then be depressed causing movement of the plunger (13) to bring the recess (17) into lateral alignment with the locking balls (15) as described in connection with the first embodiment. A R-clip (31) described in connection with the first embodiment could also be engaged in the aligned slots (38) in the head portion (12), as seen in FIG. 4, in order to provide a mechanical lock of the device in an operating condition.

Figure 7:
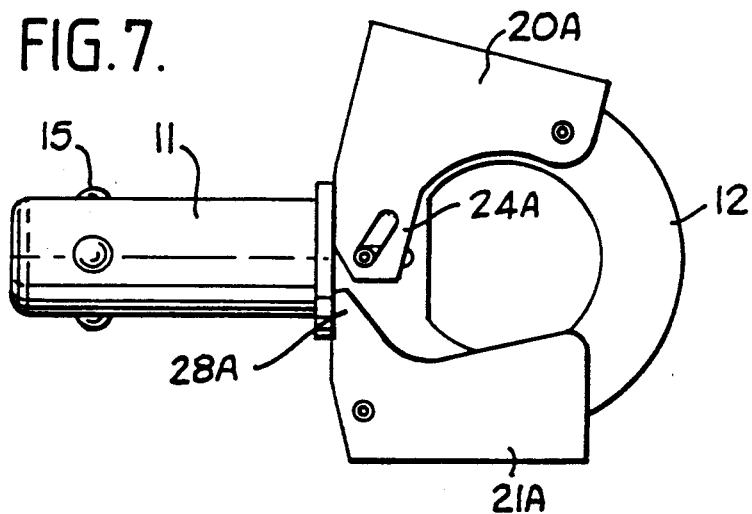

The above-described two stage release action of this coupling device is illustrated in FIGS. 7 and 8. In FIG. 7, the safety catch (20A) has been depressed causing its leg portion (28A) to be moved out of abutment with the leg portion (24A) of the release catch (20A). Then, as shown in FIG. 8, the release catch (20A) can be depressed in order to allow the device to be unlocked and withdrawn from a receptor socket. It will be noted that movement of the release catch (20A) to cause unlocking of the device produces a partial closure of the eye in the ring-shaped head portion (12). If a hook or lanyard engaged therewith have an operating load on it, such release would be further hindered.

FIGS. 9 to 11 show a further embodiment in which alternative safety release mechanism is provided. Once again the description of this embodiment will be restricted to the form of the safety release mechanism. The release catch (20) is in the form of a pivotally mounted lever in accordance with the lever (20) of the embodiments of FIGS. 1 to 3. However the safety catch of that embodiment is replaced by a depressable button form of safety catch. The safety catch (20B) comprises a strip of flexible material secured at one end in a narrow channel (40) formed between an annular collar (41) located at the junction between the shank and head portions (11 and 12) of the device and an adjacent upstanding ridge (42) formed on the head portion (12). The flexible strip (43) projects out of the channel (40) and then turns perpendicular to extend away from the collar towards the eye in the ring-shaped head (12) to form a pressure pad area (46) which is depressed when the safety catch is to be released. The strip then turns inwardly through the eye of the head portion (12) across the end (37) of the bore (12A) containing the plunger (13). The strip then again turns at right-angles to engage in a transverse cut-out portion (44) of the head portion (12) which intersects the bore (22). The inner edge of the strip (43) is turned inwardly to provide an abutment lip (45) which engages the end of the plunger (13) to prevent movement thereof to the release position of the device. The safety catch (20B) is biassed to its engaged position by a compression spring (47) which acts between the pressure pad portion of the strip (43) and an opposed side face of the head portion (12) of the device. Therefore in order to operate the release catch (20), it is necessary to depress the pressure pad (46) to move the abutment lip (45) thereof out of axial alignment with the plunger (13).

The embodiment in FIGS. 12 to 16 utilizes a pair of button-type catches one on either side of the head portion (12) which must both be released before unlocking of the coupling device can take place. The plunger (13) is provided with a transverse pin (50) in its end portion engaged within the end section (37) of the bore (12A). The pin (50) projects through diametrically opposed slots formed in the walls of the bore end portion (37) to project from opposite side faces of the ring-shaped head portion (12) of the connector device. Button members (51) are located on the projecting sections of the pin (50) such that they can be squeezed towards one another, as seen in FIG. 13. The pin (50) therefore may have at opposite ends thereof head portions contained within cavities provides within the button members (51) such that the button members are retained on those head portions whilst allowing a degree of movement of the button members (51) in the axial direction of the pin (50). The button members (51) are biased in the outward direction by compression springs (52) which encircle the pin (50) and act against side faces of the head portion (12). The button members (51) have laterally projecting lips (53) on either side thereof for cooperating with stop members (54) provided on the head portion (12). The stop members (54) are in the form of a pair of spaced upstanding posts having inwardly projecting abutments (55) in their upper ends for engaging respectively the lateral lips (53) of the buttons when in their normal locked position. In order to release the mechanism, it is necessary to depress both buttons (51) against the action of compression springs (52) acting thereon, so that the lips (53) of the buttons are moved out of alignment with the abutment surfaces (55) of the fixed posts (54). With the buttons held depressed, they can then be slid axially in the rightward direction as seen in FIG. 12 so that the lateral lips (53) pass beneath the abutments (55) of the fixed posts (54) allowing unlocking of the coupling device.

The embodiment shown in FIGS. 17 and 18 show further embodiments of a coupling device according to the invention which may have particular application for scaffolding systems. In this case, the ring-shaped head portion (12) is formed with a projecting formation (60) which houses the release catch (61). A transverse slot (62) is formed in the projecting formation (60) to intersect the end portion (37) of the bore (12A) in the shank (11). The release catch (61) is in the form of a lever pivotted on a pin (63) extending transversely of the slot (62). The lever (61) has a projecting leg portion (64) which engages beneath the pin (25) of the plunger (18) whereby clockwise rotation of the lever (61) about the pin (63) causes the plunger (18) to be moved to the release condition. Since the release catch (61) is contained completely within the head portion (12), it cannot be accidentally engaged to cause release of the device. Release of the device requires the use of a suitable tool, for example a spike. Aligned transverse apertures are provided in the wall portions of the slot (62) in the head formation (60) and in the release lever (61), when that lever is in its release condition. The apertures in the head formation (60) being designated (65) and the aperture in the release lever (61) being designated (66). In the normal locked condition, the aperture (66) is partially out of alignment with the aperture (65) as seen in FIGS. 17 and 18. Insertion of a suitably dimensioned spike into these apertures causes axial alignment of the apertures and therefore movement of the plunger (18) to the release condition of the device.

Further sets of transverse apertures (67) are formed in the head portion (12) to intersect the bore (37) to allow the insertion of one leg of an R-clip in order to provide a mechanical lock of the plunger in its locked condition. Another set of transverse apertures (70) are formed in the wall of the slot (62) and cooperate with a similar aperture (69) in the release catch (61). The apertures (69 and 70) are in alignment when the release catch is in the condition shown in FIG. 18 such that the device is in its locked condition. An R-clip can be inserted in the aligned apertures (69 and 70) to maintain the device in its locked condition.

Coupling devices as described above can be engaged in receptor sockets of the general form shown in FIGS. 29-31 of European Patent Application 89307199.2, the disclosure of which is incorporated herein by reference. Generally such sockets would be recessed in a wall structure allowing a connector device in accordance with the invention to be releasably secured in any selected socket. FIG. 23 shows another possible form of receptor socket comprising a tubular sleeve (70) which is externally knurled or provided with a shallow external screw thread for keying purposes. A collar (71) has a depending tubular shank which is screwed into an end section of the sleeve (70). The collar has flats on opposite side thereof to allow adjustment thereof using a spanner so that the length of the sleeve can be adjusted as required to fit the different possible types of releasable coupling devices in accordance with the invention. A transverse pin (72) is provided midway along the sleeve (70) to act as an end stop for a spring-loaded closure cap, of the type illustrated in FIG. 29B and FIG. 30 of European Patent Application 89307199.2 and of the type illustrated in FIG. 25 of the accompanying drawings. In FIG. 23, the internal end of the sleeve is closed with a press-fitted plastics cap (73). In the embodiment shown in FIG. 19 the end of the sleeve (70) is formed with a wedge-shaped end as illustrated in FIG. 20. Alternatively the sleeve may have a conical end formation as shown in FIG. 21. Furthermore the transverse pin (72) may be omitted and an intermediate section of the sleeve may be swaged inwardly as shown in FIG. 22 to provide an internal abutment for receiving an end portion of a biassing spring for a closure cap.

FIG. 24 shows another possible form of receptor socket comprising a tubular sleeve (80) having an annular internal recess (81) formed at a position spaced from the end of the sleeve into which a coupling device is to be engaged, in order to receive the locking balls of the coupling device in its locked condition. A flange ring (82) is press fitted on a reduced external diameter portion of the sleeve at the free end thereof. At the opposite end of the sleeve, an internally screw threaded bush (83) is press fitted into the end of the sleeve (80) and welded thereto. As illustrated in FIG. 25, the insert (83) enables a screw threaded stud to be engaged with the receptor socket (80) in order to locate it in position in a wall structure. FIG. 25 also illustrates a spring loaded closure cap (86) for the socket and FIG. 26 illustrates a releasable coupling device (10) as shown in FIGS. 1 to 3 engaged in the receptor socket with the locking balls (15) locked in the annular internal recess (81) formed within the sleeve (80) and the closure cap moved down within the sleeve (80) against its biassing spring by engagement of the coupling device (10) within the receptor socket. On release of the safety and release catches (21 and 20) of the connector device (10) thereby unlocking the device, ejection of the device is facilitated by the biassing spring acting on the end cap (86). In this embodiment also, a different form of closure cap (90) is illustrated for the internal end of the sleeve (80). A plastics closure cap (90) would suffice when the sleeve (80) is resin bonded to a wall structure.

FIGS. 27-30 illustrate a further embodiment of a plug-in locking device for releasably engaging in a receptor socket part as described above. The locking device has a generally similar construction to the locking device described in European Patent Application No. 89307199.2, the disclosure of which is incorporated herein by reference, with reference to FIG. 32 thereof The locking device comprises a body member (140) having an axial bore which is closed at the forward end of the probe. Located within the bore of the body member (140) is a cylindrical locking control member (141) having a reduced diameter forward end portion 142. The opposite end of the control member (141) is formed with a blind bore (143) which is intersected part-way along its length by a diametrical slot (144) extending from the rear end of the control member (141) along the axial direction thereof. A rotary control pawl (145) is located within the diametrical slot (144) and the rotary position thereof is controlled by a spring-loaded ball (146). An annular recess (147) is formed in the internal surface of the body member (140) to cooperate with notched opposite end surfaces of the pawl (145) in the latched condition thereof. Four equi-angularly spaced bores (148) are formed through the wall of the probe (140) adjacent the forward end thereof. The bores (148) have walls which converge in the outward direction to receive and locate locking balls (149). When the balls are in contact with the main body portion of the control member (141) they are maintained in their outwardly projecting locking position whereas when the control member is moved so that the reduced diameter end portion (142) of the control member is radially aligned with the balls, then the balls can be moved inwardly of the probe to allow release thereof.

An apertured flange ring (150) is located in an external annular groove (151) is located on the outer periphery of the probe body (140) by a snap ring (152). The apertured flange ring (150) shown in FIG. 29 is formed with a slot (190) to accommodate a short length of lanyard which might be sewn to provide an aperture to engage a safety hook arrangement of a lanyard for a safety belt or harness, e.g. as described in European Patent Application No. 89307199.2.

An actuator handle (153) having an axial bore, is slidably mounted on the rear end portion of the body member (140) with a compression spring (154) acting therebetween. The actuator handle (153) is retained on the probe (140) by a pin (155) engaging in diametrically opposed apertures formed in the wall of the actuator handle (153) and passing through slots (156) formed in diametrically opposed portions of the wall of the body member (140) to engage in transverse apertures formed in the side walls of the control member (141) such that the actuator handle (153) and the control member (141) move together as a unit.

In order to permit a locking sequence to take place, namely the insertion of the plug-in locking device in a receptor socket of the types described above, the actuator handle (153) is moved relative to the body member (140) against the action of compression spring (154) in order to achieve release of the rotary latching pawl (145) from the latched condition thereof shown in FIG. 28. The notched end of the pawl, which is initially engaged with an edge of the recess (147) in the latched condition illustrated in FIG. 28, becomes disengaged therefrom so that the pawl is rotated by the spring loaded ball (146) to a position in which its pair of longer peripheral edges are generally perpendicular to the axis of the control member (141). On subsequent release of the actuator handle (153), the handle is moved in opposite direction under the action of compression spring (154) together with the control member (141) relative to the body member (140) such that the reduced diameter tip portion (142) of the control member is in transverse alignment with locking balls (149) allowing them to move inwardly of the probe body during the insertion step. During this movement the repositioned pawl (145) engages the right hand annular edge wall of the recess (147) with an unnotched longer peripheral edge of the pawl. Further movement of the actuator handle (153) and control member (141), in this direction under the action of spring (154), causes the pawl to be rotated to a position in which it is contained completely with the slot (144) in the control member (141).

During insertion of the locking device into a receptor socket, e.g. as illustrated in FIG. 25, the spring-loaded cup-shaped member (86) is moved within the body of the receptor socket against the action of compression spring acting thereon, on engagement therewith by the end of the body member (140). When the body member (140) has been inserted sufficiently for the locking balls (149) to be within the larger diameter internal cavity (81) of the receptor socket, the actuator handle (153) is again moved relative to the body member (140) against the action of compression spring (154) so that when the pawl (145) is laterally aligned with the recess (147) in the body member, the spring-loaded ball (146) now acting on a notched peripheral edge of the pawl, causes the pawl to project into the recess with the opposite notched edge thereof facing the right hand annular side wall of the recess (147). On release of the actuator handle, it is moved to the right as viewed in FIG. 28 under the action of spring (154) so that the latching pawl (145) is brought to its latched condition as shown in FIG. 28 whereby the locking balls (149) are maintained in the outwardly projecting locking position in which they engage in the internal cavity (81) of the receptor body (110), thereby preventing withdrawal of the body member (140) from the receptor socket.

In order to disengage the locking device and release it from the receptor socket, the actuator handle (153) is again manually moved in the leftward direction as viewed in FIG. 28 with respect to the body member (140), against the action of spring (154), in order to release the latching pawl (145) from its latched condition allowing on subsequent rightward movement of the actuator (153) and the control member (141), the locking balls (149) to be moved to their unlocked condition in which they engage the smaller diameter end portion (142) of the probe (141). Locking device (140) can then be withdrawn from the receptor socket.

The latching and unlatching sequence of the latching pawl (145) under the control of the spring-loaded ball (146) is in accordance with the latching and unlatching sequences of the rotary pawls of the releasable locking mechanisms described in British Patent No. 2,140,495 and European Patent Application 89307199.2 and corresponding U.S. patent application Ser. No. 07/383,311; Canadian Patent Application No. 606,297 and Japanese Patent Application No. 1-190405, the disclosures of which are incorporated herein by reference.

In order to prevent accidental release of the locking mechanism when inserted in a receptor socket in an accidental contact with the actuator handle (153), the locking device is provided with a release mechanism comprising a release catch (160) and a safety catch (161) cooperating therewith, both of which must be manipulated to allow the release mechanism to be operated. The release catch (160) and the safety catch (161) comprise respective levers pivotally mounted on opposite sides of the actuator handle (153) on pivot pins (162,163), respectively. Coil springs (164,165) encircle the pins (162,163), respectively, and act between the actuator handle (153) and the levers (160,161) to bias the levers to a cooperating, interlocking condition. The body member (141) has a pair of outwardly projecting pegs (166), one of which is seen in FIG. 27, projecting on opposite sides thereof and the release lever (160) has a pair of abutment portions (167) lying on opposite sides of the actuator handle (153) to engage the pegs (166) to prevent movement of the actuator handle (153) and the control member (141) relative to the body member (140) which would cause unlatching of the rotary pawl (145) from its latched condition as shown in FIG. 28. Such relative movement cannot therefore take place without depression of the release lever (160). To prevent accidental release of the lever (160), the safety catch lever (161) is formed with a pair of projecting legs (170) lying on opposite sides of the actuator handle (153). The projecting legs abut the release lever portions (167) thereby to prevent operation of the release lever (160) without initial depression of the safety catch lever (161) which causes the projecting legs (170) thereof to move to positions out of engagement with the release lever portions (167). A release sequence of the locking device, as described above, can then be effected.

In a similar fashion operation of both the safety catch and release levers (161 and 160) is required before a locking sequence of the locking device, as described above, can take place.

FIGS. 31 to 33 show an embodiment which is generally similar to that of FIGS. 9 to 11 and like reference numerals are used for like parts. The principal difference lies in the construction of the depressable button (20D) which provides the safety catch.

The plunger portion (18) is formed with a transverse slot (200) which receives the nose portion (24) of the release catch (20) which controls the slidable movement of the plunger between the release and locked conditions of the locking balls (15). The hollow shank (11) where it joins the head portion (12) is recessed at (208) on opposite side surfaces thereof. Apertures (206,207) extend from the recesses (208) through the wall of the shank (11) to open into the internal bore of the shank (11). The safety catch (20D) is in the form of a U-shaped plastics strip (204), the base of which extends across a recess formed in the inner periphery of the ring-shaped head (12) and the side walls of which lie in the recesses (208) in the opposite side faces of the shank (11). The side walls of the strip (204) have inwardly extending circular projections (202,205) which engage in the apertures (206,207) respectively. The end surface of the projection (205) is inclined to the axis of the hollow shank (11).

The safety catch button (20D) is biassed by a compression spring (203) to the position shown in FIG. 32, in which the projection (205) extends into the bore of the shank portion (11) to prevent axial sliding of the plunger (18) to the release condition. The safety catch button (20D) must be depressed against the action of the spring (203) to move the projection (205) to a position in which it does not protrude into the shank bore thereby allowing operation of the release lever (20) to move the plunger (18) to its release position.

FIG. 33 illustrates the coupling device of FIGS. 31 and 32 when plugged into a receptor socket located in a blind bore (210) in a wall structure. The socket comprises a tubular body (211) which has an entry insert (212) with an integral facing flange, the insert extending from within one end of the body (211) and which has a closure cap (213) at its other end. The cap has a conical head corresponding to the end of the bore (210) and a tubular section (214) which fits within the corresponding end of the body (211). The tubular section (214) is strengthened by cross bracing sections (215), shaped as a cruciform when viewed in transverse cross-section. The socket is provided with a closure cap (216) biassed by spring (217) and which is similar in form to the cap (86) of FIG. 26. The cap has four equi-angularly spaced resilient axial extensions having outwardly projecting abutments (218) to engage the annular inner end wall of the entry insert (212) to prevent the spring-loaded cap (216) from being ejected from the socket (211) when the coupling device (11,12) is removed from the socket (211). Similarly the locking balls of the coupling device (11,12) engage the inner end wall of the entry insert (212) when the shank (11) of the coupling device is inserted into the receptor socket (211) and the locking balls are held in their locked condition projecting outwardly of the shank (11).

I claim:

1. A coupling or attachment device comprising a head portion and a hollow shank projecting therefrom for plugging into a receptor socket, the shank being provided with locking means movable transversely thereof between a projecting locked condition and a retracted free condition, and control means movably mounted within the shank between a first position maintaining the locking means in said locked condition and a second position allowing movement of said locking means to said free condition, said head portion having a release mechanism comprising actuator means for moving said control means from said first position to said second position and releasable means cooperating with the actuator means or the control means and adapted to prevent operation of said control means by an inadvertent or accidental engagement with the actuator means;

wherein said actuator means comprise a pivotally mounted release lever having a portion interlinked with said control means, said lever having a portion projecting from said head portion allowing a manual manipulation of the release lever to move said control means from said first position to said second position thereof; and wherein said releasable means comprise a pivotally mounted second lever having an abutment portion engaging a portion of said release lever to prevent movement thereof to move said control means from said first position to said second position thereof, said second lever having a portion projecting from said head portion allowing a manual manipulation of the second lever to remove said abutment portion from its position obstructing operation of said release lever.

2. A coupling or attachment device comprising a head portion and a hollow shank projecting therefrom for plugging into a receptor socket, the shank being provided with locking means movable transversely thereof between a projecting locked condition and a retracted free condition, and control means movably mounted within the shank for motion in a direction between a first position maintaining the locking means in said locked condition and a second position allowing movement of said locking means to said free condition, said head portion having a release mechanism comprising actuator means for moving said control means from said first position to said second position and releasable means cooperating with the actuator means or the control means and adapted to prevent operation of said control means by an inadvertent or accidental engagement with the actuator means;

wherein said releasable means comprise manually operable means located on said head portion and having an abutment portion projecting inwardly of said shank with a surface facing in the direction of motion of said control means and engaging an opposed surface of said control means, said manually operable means cooperating with said control means to selectively mechanically lock said control means so as to prevent movement thereof from said first position to said second position, said manually operable means being movable, when manually operated, to remove said surface of the abutment portion from engagement with said control means thereby allowing movement of said control means to said second position upon actuation of said release lever.

3. A device according to claim 2, wherein said manually operable means comprises a manually depressable member which, when manually pushed, moves relative to said head portion to correspondingly move said abutment portion toward disengagement with said control means, said manually depressable member being substantially flush with an exterior surface of said head portion, whereby the possibility of accidental depression of said manually depressable member is minimized.

4. A coupling or attachment device comprising a head portion and a hollow shank projecting therefrom for plugging into a receptor socket, the shank being provided with locking means movable transversely thereof between a projecting locked condition and a retracted free condition, and control means movably mounted within the shank between a first position maintaining the locking means in said locked condition and a second position allowing movement of said locking means to said free condition, said head portion having a release mechanism comprising actuator means for moving said control means from said first position to said second position and releasable means cooperating with the actuator means or the control means and adapted to prevent operation of said control means by an inadvertent or accidental engagement with the actuator means; wherein said actuator means and said releasable means comprise manually depressable catch members located on opposite sides of said head portion and linked to said control means so that sliding movement of the catch members cause said control means to move from said first position to said second position thereof, and abutment means on respective opposite sides of said head portion to prevent said sliding movement of the catch member until both catch members have been manually depressed.

5. A coupling or attachment device comprising a head portion and a hollow shank projecting therefrom for plugging into a receptor socket, the shank being provided with locking means movable transversely thereof between a projecting locked condition and a retracted free condition, and control means movably mounted within the shank between a first position maintaining the locking means in said locked condition and a second position allowing movement of said locking means to said free condition, said head portion having a release mechanism comprising actuator means for moving said control means from said first position to said second position and releasable means cooperating with the actuator means or the control means and adapted to prevent operation of said control means by an inadvertent or accidental engagement with the actuator means; wherein said actuator means comprise a pivotally mounted release lever having a portion interlinked with said control means, said releasable means comprising a head portion adapted to contain said release lever internally thereof thereby to shield the release lever from accidental actuation, and operating means provided to enable the release lever to be operated only with a suitably shaped tool.

6. A device according to claim 5 wherein said operation means comprise a pair of aligned apertures in flank portions of said head portion overlying opposite sides of the release lever and an aperture in said actuation lever which is partly out of alignment with said pair of aligned apertures when said control means is in said first position thereof, requiring insertion of a suitably shaped tool into said aperture and said pair of apertures to bring them all into a alignment thereby pivoting the release lever to move the control means to said second position thereof.

7. A device according to any one of claims 1, 2, 4 or 5 wherein said control means includes a probe slidably mounted within said shank with interengageable latching means between said probe and said shank, said latching means being actuated by relative movement of the probe and the shank to be automatically engaged in a latched condition when the probe and shank are moved relative to one another in a first direction by a predetermined amount so as to restrict subsequent relative movement in the same direction, and are brought automatically into an unlatched condition on a predetermined amount of relative movement from the latched condition in the opposite direction, allowing subsequent free relative movement between the probe and shank in said first direction; wherein said projecting locked, and said retracted free conditions of said locking means correspond to said latched and unlatched conditions, or vice versa, of said control means, and wherein said release mechanism prevents relative movement of said probe and shank from said condition thereof corresponding to said locked condition of said locking means to said condition thereof corresponding to said retracted condition of said locking means, until both said actuator means and said releasable means of the release mechanism have been operated.

8. A coupling or attachment system comprising a device according to any one of claims 1, 2, 4 or 5 and at least one receptor socket for location in a wall structure to receive said shank of said device, the receptor socket having internal abutment means to cooperate with said locking means, when in the locked condition thereof, to retain the shank within the receptor socket.

9. A device according to any of claims 1, 2, 4 and 5 wherein said locking means comprise at least one locking member movable transversely of the axis of the shank through an aperture in the wall thereof.

10. A device according to any of claims 1, 2, 4 and 5 wherein said control means comprise a control member slidably mounted within the shank and having portions to act on said locking member to maintain it in said locked condition and to allow it to move to said free condition, respectively.

11. A device according to any of claims 1, 2, 4 and 5 wherein said control means are biased by resilient means to said first position thereof.

12. A device according to any of claims 2, 4 or 5 wherein said actuator means comprise a pivotally mounted release lever having a portion interlinked with said control means, said lever having a portion projecting from said head portion allowing a manual manipulation of the release lever to move said control means from said first position to said second position thereof.

* * * * *